Sept. 24, 1946.  F. B. McCLURE  2,408,264
DRIVING AXLE FOR MOTOR VEHICLES
Filed Dec. 10, 1943  3 Sheets-Sheet 1

Fred B. McClure
INVENTOR

Sept. 24, 1946.   F. B. McCLURE   2,408,264
DRIVING AXLE FOR MOTOR VEHICLES
Filed Dec. 10, 1943   3 Sheets-Sheet 2

Fred B. McClure
INVENTOR

Sept. 24, 1946.    F. B. McCLURE    2,408,264
DRIVING AXLE FOR MOTOR VEHICLES
Filed Dec. 10, 1943    3 Sheets-Sheet 3

Fred B. McClure
INVENTOR

Patented Sept. 24, 1946

2,408,264

UNITED STATES PATENT OFFICE 2,408,264

DRIVING AXLE FOR MOTOR VEHICLES

Fred B. McClure, Moundsville, W. Va., assignor of one-fourth to W. L. Stroup, Moundsville, W. Va.

Application December 10, 1943, Serial No. 513,692

5 Claims. (Cl. 180—71)

The invention relates to improvements in axles which transmit motive power to the driving wheels of motor vehicles; and the objects of the improvement are, first, to reduce the manufacturing costs of motor vehicles, particularly passenger automobiles; second, to reduce the operating costs of motor vehicles by the elimination of several power transmission mechanisms that are subjected to constant wear and require constant lubrication in the operation of present conventional automobiles; third, to reduce maintenance costs by the elimination of those mechanisms mentioned above; fourth, to attain almost complete silence in the operation of motor vehicles so far as concerns the transmission of power; fifth, to attain smoother operation of motor vehicles by the elimination of shock-conducting mechanisms in power transmission.

Figure 1:
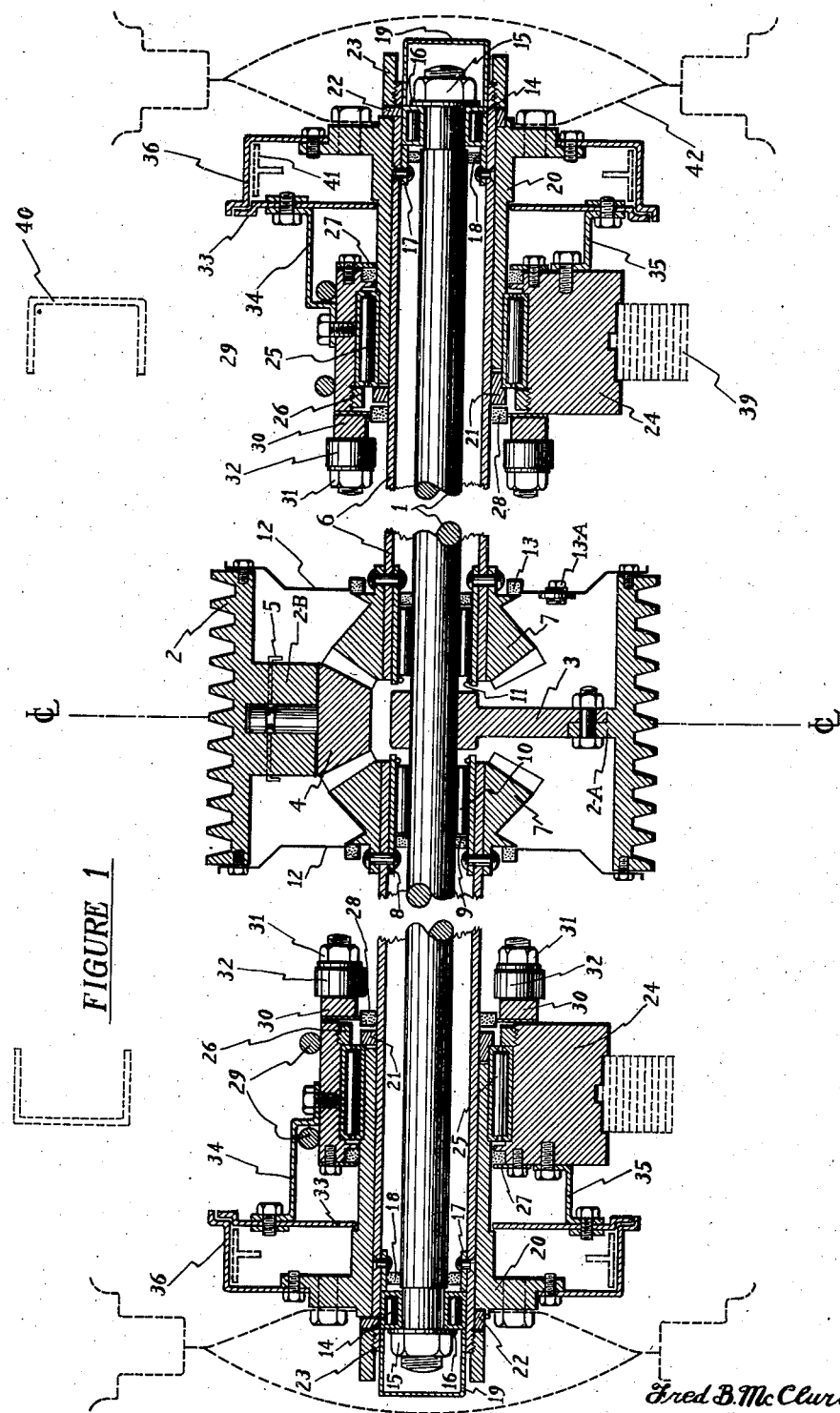
Figure 2:
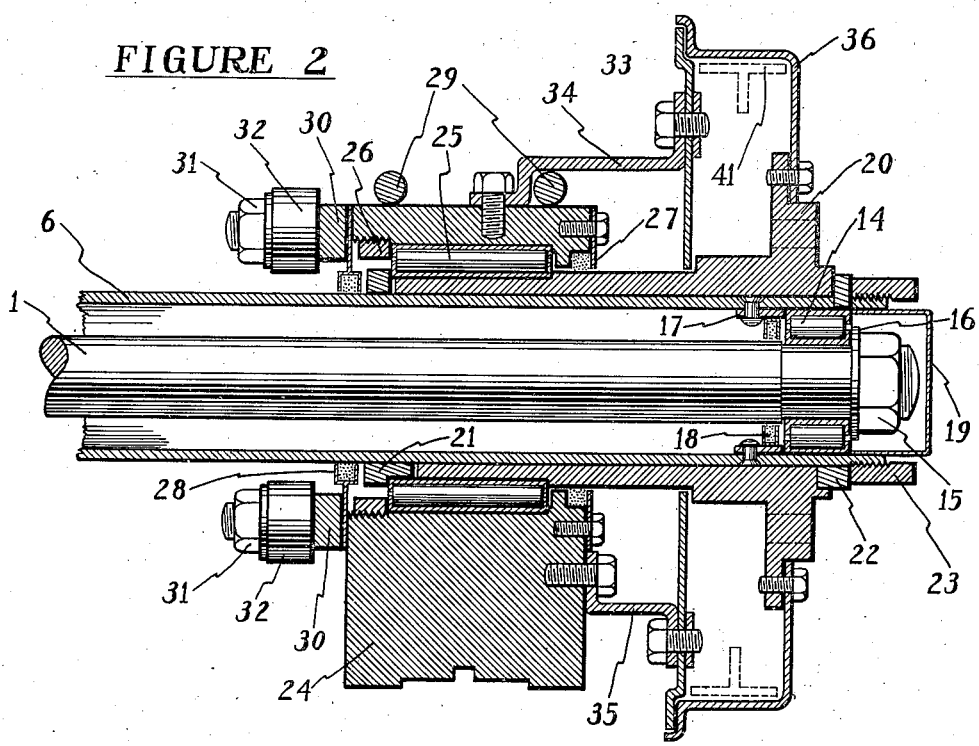
Figure 3:
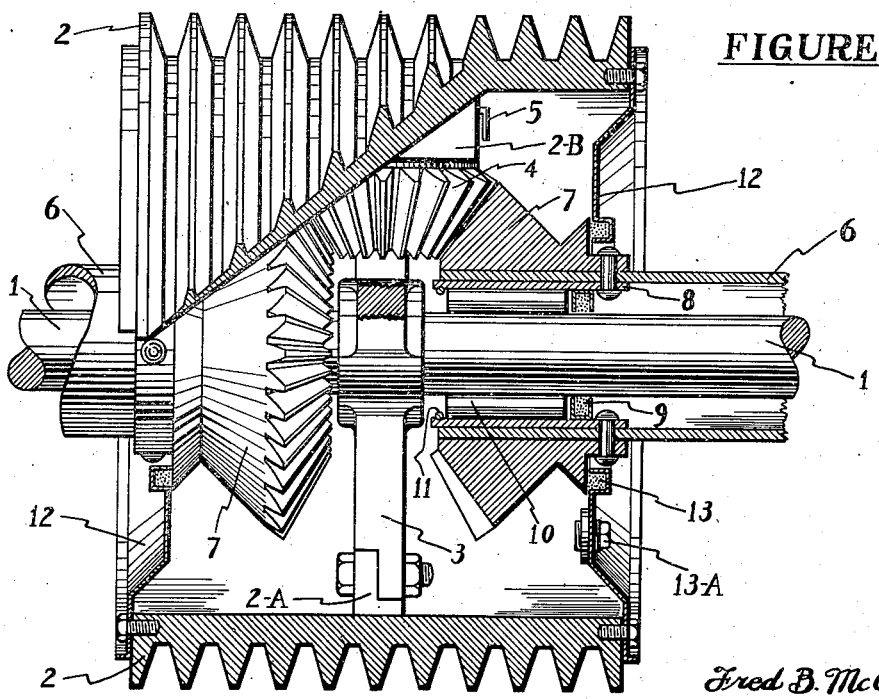
Figure 4:
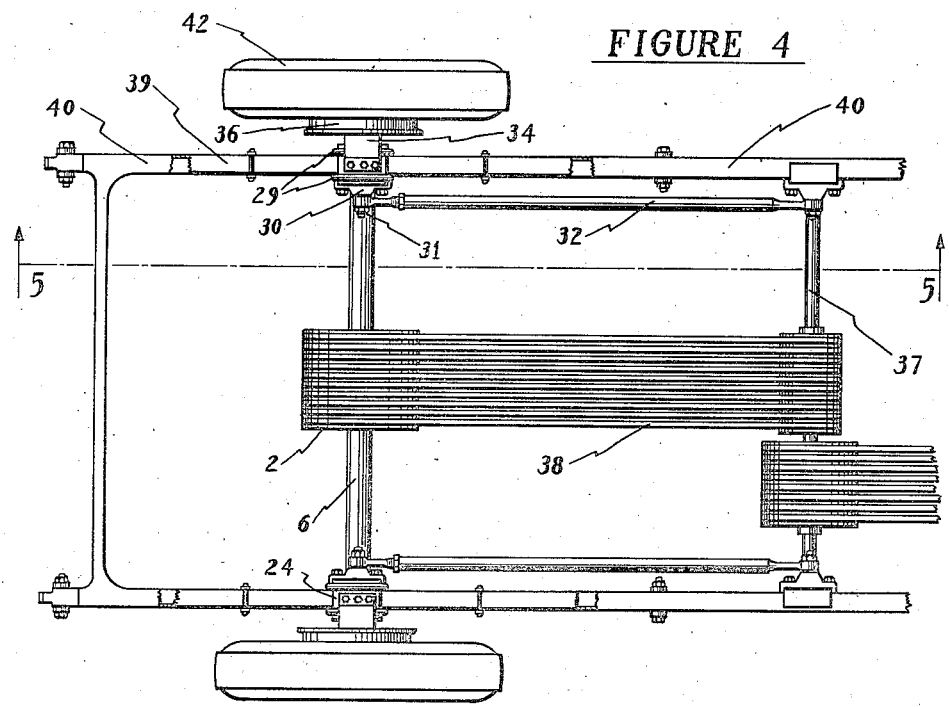
Figure 5:
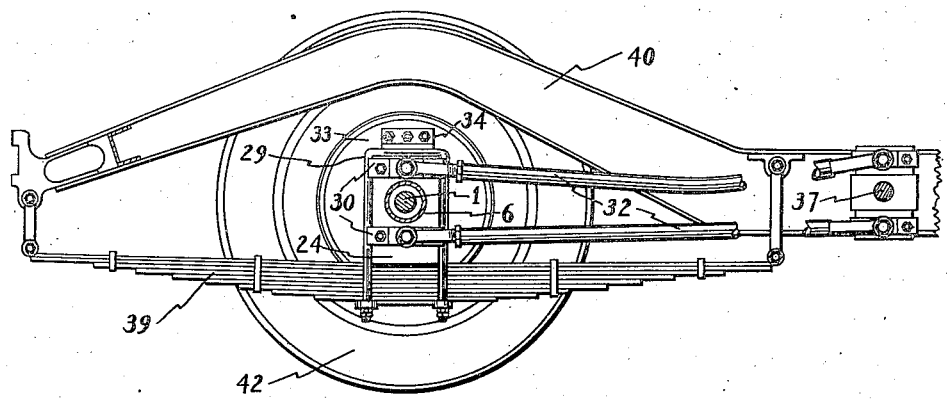

One form of the invention is illustrated in the accompanying drawings, in which Figure 1 is a vertical section of the entire axle which is symmetrical about the vertical center line; Figure 2 is a vertical section of one end of Figure 1, made to a larger scale than Figure 1 to more clearly illustrate the parts; Figure 3 is a vertical section, partly diagrammatic, of the central part of Figure 1, made to a larger scale than Figure 1 to more clearly illustrate the parts; Figure 4 is a plan view of the axle, assembled in a vehicle chassis having portions of its frame omitted to show the entire top of the axle. Figure 5 is a vertical view, on the line 5—5 of Figure 4, having portions of the radius rods cut away to expose the front shackle of the vehicle spring.

The shaft 1 is the core of the axle and supports the other parts in position and provides adjustment for some of the parts; the principal function of shaft 1 is to maintain alignment of the other parts illustrated in Figure 1.

The grooved sheave 2 has, in this instance, ten grooves around the outside for the reception of V shaped belts, and a detachable hub 3, loosely disposed on shaft 1, having 3 arms, or spokes, which are removably attached to lugs 2—A on the inner side of part 2. On the inner side of 2 are also three block-like bases 2—B, evenly spaced between the spoke attachment lugs 2—A, each having a radially disposed well in its center for the reception of the stud shaft of gear 4. The gears 4 are radially disposed in part 2 and seat against the bases formed by the blocks 2—B on the inner side of 2, with the stud shaft of each gear 4 fitting into the well in the center of each block 2—B, and each gear 4 is held in place by a small rod 5 passing through a cross hole in the block 2—B, so located that the rod 5 engages loosely in a groove cut around the shaft of gear 4. Each end of rod 5 is bent to the face of the block after passing through and is thus held in place and in turn holds gear 4 in place during assembly, but being engaged loosely in the groove of the shaft of 4, allows gear 4 to rotate freely.

Hub 3 has an axial bore and is disposed loosely on shaft 1. The principal function of part 3 is to keep part 2 concentrically spaced about part 1.

Part 6, 6 is a seamless tube of larger diameter than shaft 1 and surrounds same, as a housing. Each part 6 extends from a point near the middle of shaft 1 to a point near the end of shaft 1 (see Figure 1).

Beveled gear 7, 7 (see Figure 3) is mounted on one end of 6 with a tight fit and is permanently secured to tubes 6 by means of rivets.

Bearing sleeve 8, 8 (see Figure 3) is inserted in tube 6 with a tight fit and is secured by the same rivets that secure gear 7.

A lubrication seal ring 9, 9 (see Figure 3) is placed inside of sleeve 8 and about shaft 1, and is stopped by the rivet heads inside of sleeve 8.

Roller bearing 10, 10 (see Figure 3) is placed inside of sleeve 8 and about shaft 1, and is stopped by the seal ring 9.

Bearing retainer 11, 11 (see Figure 3) is an open ring of spring wire which is sprung into a small groove cut around the inside of sleeve 8 near its outer or exposed end, to retain the bearing 10 within the sleeve 8.

Cover plate 12, 12 (see Figure 3) is a circular plate having a central opening. The outer edge is turned to provide stiffness and is bolted to the side of part 2 with a gasket between 12 and 2 to prevent oil leakage. About the central opening of 12 is a channel formed in the plate to hold a ring of oil seal material 13, 13 (see Figure 3). The wall of 12 is offset to bring the central opening into such position that the oil seal 13 will be held against a shoulder on the back of gear 7 with a constant tension sufficient to effectively prevent oil leakage.

All of the foregoing parts described form a compact assembly about the vertical center line in Figure 1. Power is delivered to the grooved periphery of part 2, in this instance, by a group of matched belts, causing the rotation of 2 which carries with it the spider gears 4, 4, 4 which are meshed with gears 7, 7 (see Figure 3), thereby causing gears 7—7 to rotate simultaneously with part 2; and the gears 7, 7 being affixed to the tubes 6, 6, cause the tubes 6, 6 to rotate simultaneously with part 2. Thereby motive force or power is transmitted from the driving belts to the tubes 6, 6 which in turn deliver it to the vehicle wheels as described later.

The foregoing parts, consisting of the driving sheave and its contained differential gears, and the driving tubes which transmit forces to and from the differential, are disposed loosely, or rotatably, on shaft 1 which maintains the alignment of the axle structure. Part 3, being loosely disposed on shaft 1, keeps the driving sheave 2 in perpendicular alignment with shaft 1, and concentrically spaced about same, and, being detachable from part 2, at 2—A, permits the placement, or removal, of the radially disposed differential gears which are rotatably secured in part 2 at 2—B. The differential bevel gears 7 are fixed on the inner ends of tubes 6, and engage the radially disposed differential gears, in opposition. Therefore, forces are transmitted to and from the differential only by means of tubes 6. When forces applied to the periphery of sheave 2 cause non-differential rotation of the axle, all the parts 1 to 13 inclusive, move simultaneously, or rotate as one unit about the diametrical center of shaft 1. Therefore, during such operation of the axle, there is no individual rotation of the gears 4, 4, 4; no movement of the shoulder of gears 7, 7 against the oil seal 13, 13; no movement between the shaft 1 and the oil seals 9, 9; and, the roller bearings 10, 10 are inactive as anti-friction bearings. During differential operation of the axle there will be rotation between one, or both, of gears 7 and oil seals 13, and between one, or both, of tubes 6 and shaft 1, and the bearings 10 will then serve as anti-friction bearings. Hub 3 will, if required, rotate on shaft 1, and, being movable along shaft 1, will automatically equalize the clearance between the differential gears 4 and 7.

To lubricate the gears and bearings described above, a quantity of lubricant is placed inside the cover plates 12, 12 through a plug in one of the plates, illustrated as part 13—A (see Figure 1). As a result of the very limited action of the enclosed gears and bearings, with effective seals preventing leakage, the initial charge of lubricant can be expected to last indefinitely, as well as the oil seal material which is likewise subjected to very little wearing action.

The entire axle being symmetrical about the vertical center line in Figure 1, one end only will be used in describing the following: The outer end of tube 6 (see Figure 2) is centered about shaft 1 by a roller bearing 14, which is subjected to a lateral thrust when forces are applied to the differential gears, and is inactive as an anti-friction bearing except at such times as differential action occurs, for the same reasons ascribed to bearing 10.

A castellated nut 15 is threaded on the end of shaft 1, and, thrusting against washer 16 which is placed against the outer end of bearing 14, forces the inner end of bearing 14 against the thrust collar 17, which has a tight fit inside of tube 6 and is secured by rivets through the wall of 6, the rivets having flat countersunk heads on the outside. This assembly provides for and maintains the adjustment of the differential gears.

An oil seal ring 18 (see Figure 2) is placed inside the thrust collar 17 and about the shaft 1 and is kept in place between the rivet heads and bearing 14.

Lubrication is provided for bearing 14 and sealed at its outer end by the cup-shaped part 19, which is pressed into the end of tube 6 until its rim contacts the end of bearing 14, and is held in position simply by pressure against the inside of tube 6.

Like the differential or compensating mechanism first described, the bearing 14 and the oil seal 18 will require very little servicing.

A sleeved hub 20 (see Figure 2) provides the hub for the vehicle wheel and transmits the power from tube 6 to the vehicle wheel. A flange at its outer end has two offsets or shoulders and the sleeve has two small offsets or shoulders on the outside surface. It has a straight bore of such diameter that a tight fit is obtained when it is mounted on the tube 6, and both ends of hub 20 are castellated in 45 degree segments for coupling engagement.

Coupling 21 (see Figure 2) is a castellated ring or collar fitted tightly about tube 6 and permanently welded in place. It has castellations matching those at the inner end of hub 20. The body or collar part of the ring has an outside diameter slightly greater than the outside diameter of the castellations, resulting in a small exterior shoulder at the base of the castellations.

Coupling 22 (see Figure 2) is a removable coupling. It is a circular piece having horizontal and vertical castellations. The horizontal castellations match those at the outer end of hub 20, and their inside diameter is such that the piece is easily placed about the outside of tube 6. The vertical castellations are internal, and occupy segments alternate to those occupied by the horizontal castellations, projecting inward for a distance equal to the thickness of the wall of tube 6. These lugs or vertical castellations engage in cut out segments at the end of tube 6, which is castellated in proper alignment with the fixed or permanent coupling 21. The end of tube 6 is threaded over the castellations.

Nut 23 (see Figure 2) which is simply an internally threaded ring or collar, is threaded on the outer end of tube 6 and serves to secure hub 20, engaged by couplings 21 and 22, thereon.

The vehicle wheels 42, illustrated by broken lines in Figure 1 and also illustrated in Figures 4 and 5; the chassis frame 40, the springs 39, and the braking mechanism 41, where illustrated; and, the intermediate shaft 37 and driving belts 38 illustrated in Figure 4, are not a part of this specification, but are shown in the drawings and described herein for illustrative purposes only.

One method for attaching a wheel to hub 20 (see Figure 1) is for a flange of the wheel 42 to seat upon and about the smaller or outermost shoulder of hub 20 and be securely bolted to the thick part of the flange of hub 20. The hub shoulder upon which the wheel is seated has a diameter slightly greater than the outside diameter of coupling 22 and nut 23, so that the wheel may be quickly placed or removed without disturbing any other parts.

The journal box 24, 24 (see Figure 1) has several functions; it supports a portion of the vehicle load or weight through the attachment of the vehicle springs; it is the part from which motive force is transmitted by radius rods to the vehicle frame; and, it supports the brake housing plate or flange to which is attached the braking mechanism. It is assembled about hub 20 as follows:

Hub 20 is passed through roller bearing 25 (see Figure 2) which is contained in journal box 24, before hub 20 is assembled on tube 6. One end of the inner race of bearing 25 stops against a shoulder on hub 20, while the other end passes over the castellations of coupling 21 as they engage with hub 20 and stops against the shoulder or solid ring part of coupling 21. Therefore, when nut 23 is tightened, bearing 25 is held securely between the shoulder on hub 20 and the shoulder on coupling 21.

Near the outer or wheel side of journal box 24 is an interior flange which stops against the bearing 25 (see Figure 2), with the bore of the flange just clearing the surface of hub 20 at that point. The opposite side of 24, from which bearing 25 enters the box, is threaded inside of the bore to allow the externally threaded retaining ring 26, manipulated by means of spanner pockets in its face, to be screwed against the end of the outer race of bearing 25, thus firmly securing the journal box 24 in position about hub 20, which rotates freely within the journal box.

Retaining ring 26 (see Figure 2) may be locked in position by means of a set screw (not illustrated) through the top of the journal box, or at any convenient position.

Part 27 is a circular plate bored in its center to fit closely to but free of hub 20 (see Figure 2) and is bolted to the outer face of 24. It retains a ring of suitable grease sealing material which is inserted in the journal box 24 against its interior flange. This sealing ring retained behind the plate 27 is subjected to wear by the rotation of hub 20, but can be easily renewed when necessary.

Part 28 is a cover plate and grease seal case, attached to the inner face of journal box 24 (see Figure 2); its outside is square in shape and it has a central bore that fits closely to but free of the surface of tube 6. This part is composed of two plates so shaped that when they are placed face to face, a channel is formed around the central bore, which holds a ring of grease sealing material around the surface of tube 6. The object in making part 28 in two separable pieces is so that the grease sealing ring can be quickly renewed if necessary without removing the part from the axle, simply by separating the two pieces of part 28.

The lubrication required by bearing 25 will be equivalent to that required by a wheel or axle bearing in the conventional type of axle in general use heretofore, and can be made by means of a pressure fitting conveniently located in the journal box, and not illustrated in the drawings.

The design of the outside of the journal box 24 may be altered to suit the method used to attach the vehicle springs, but in any case, the springs, of whatever type used, will be attached in some manner to journal box 24. In this instance a leaf type spring is illustrated (see Figures 1, 4 and 5) and is suspended under the journal box, firmly secured to its bottom by the inverted U bolts 29 passing over 24, straddlewise of the axle, with their ends passing through holes in a bed plate underneath the spring, and nuts placed on the ends of the U bolts (see Figure 5). The top of the spring is seated in a channel in the bottom of 24 (see Figures 1 and 2), which has in its center the customary pocket to receive the head of the spring center bolt. The upper part of each U bolt is held in position by resting in a small saddle which is cut in the top edges of journal box 24 at the points where the U bolts turn.

Motive force is transmitted from the axle assembly to the vehicle frame by the radius rods 32 which are four in number, two leading from each journal box (see Figures 1, 4, and 5). As the radius rods are in two identical pairs, one pair only, or those leading from one journal box, will be described in the following:

The radius rods 32, 32 (see Figure 5) are each composed of a hollow shaft or tube which has at one end a solid piece welded permanently in the end of the tube, and at the opposite end a similar piece is threaded into the tube and secured in position by a lock-nut, so the length of part 32 is adjustable. The solid pieces are each drilled and fitted with a brass bushing. A pressure grease fitting is provided at each end so that the inner surface of each bushing can be lubricated.

Two spindles 30, 30 (see Figure 2) are attached to the inside face of journal box 24, being superimposed on the cover plate 28. One spindle 30 is above and one below the axle, with the longitudinal center line of each spindle exactly perpendicular to, above and below, the longitudinal center line of shaft 1 (see Figure 5). Each spindle projects from a bracket type base which fits neatly around the corners of journal box 24 at its front and back (see Figure 4). Each spindle base is bolted securely to journal box 24 at points near its front and back where there is ample purchase for the bolts in solid parts of 24 (see Figure 5). As the bases of these spindles have a firm grip on the front and back faces of the journal box, the bolts securing the bases to the journal box are not subjected to the full load of the forces transmitted to the radius rods.

The adjustable ends of radius rods 32, 32 are fitted over the spindles 30, 30 (see Figure 2) and are held in place by the nuts 31, 31 (each with an accompanying washer) threaded on the ends of the spindles and each secured by the customary cotter pin. The opposite ends of rods 32, 32 are fitted over spindles similar to 30, 30, which are attached to a base that is secured to the frame, which base also supports the bearing for shaft 37, not a part of this specification (see Figures 4 and 5). These spindles for the front ends of rods 32, 32 are located in exactly the same relative positions, respectively, to the shaft 37, as the spindles 30, 30 are located in relation to shaft 1, thereby effecting a pantographic connection between journal box 24 and the vehicle frame (see Figure 5). The motive force is thereby transmitted from the journal box to the vehicle frame, and the journal box 24 is held in a vertical position during spring action. The entire axle assembly, during spring action, travels at a constant radial distance from shaft 37, and the tension of the driving belts 38 remains constant. The adjustable radius rods allow the tension of the driving belts to be adjusted. The upper radius rod is illustrated, in this instance, as having a vertical curve or bend (see Figure 5) in order to avoid contact with the floor of the vehicle body during extreme spring action. Such a curve or bend in either or both of the radius rods will not affect their pantographic action.

Inasmuch as all upward or downward movement of the axle travels the path of an arc, it follows that the vehicle spring 39 must have freedom of movement in forward and backward directions. Therefore each end of the spring is attached to the vehicle frame with a shackle type connection (see Figure 5). The spring does not transmit any motive force, and is not required to resist any turning or rolling action of the axle assembly. The life of the spring is thereby lengthened and its springing action improved.

Part 33, 33 (see Figures 1 and 5) is a circular plate with an offset around its perimeter, and having a central hole to fit closely about but free of hub 20 at the position illustrated in Figure 1, which position is close to but not touching the shoulder or offset of hub 20. Plate 33 is the base to which is attached the brake shoes 41 and their operating mechanism, not a part of this specification. Each plate 33 is held in position by brackets 34 and 35 (see Figure 1) which are securely bolted to plate 33 and journal box 24. Brackets 34 and 35 are so designed and attached that they will hold the plate 33 rigidly in position at all times.

Brake drum 36 (see either end of Figure 1) is designed to fit closely about the offset of plate 33. The flange of drum 36 fits neatly about the large diameter shoulder on the flange of hub 20 and is bolted to that flange. With the wheel 42 removed, brake drum 36 can be easily removed for inspection or servicing of the brake shoes 41, or their operating mechanism, without disturbing any other parts of the axle assembly.

From the above description and the accompanying illustrations, it may be clearly understood that when the vehicle wheels are turning at the same speed, the entire axle assembly rotates as one unit, with the exception of the two journal boxes and the parts that are directly attached to them.

For the purpose of a symmetrical design, the driving sheaves 2, with its self-contained compensating mechanism, is placed, in this instance, midway of the axle assembly (see Figure 1). However, if conditions peculiar to any certain vehicle require it to be located elsewhere, it may be placed anywhere between the two journal boxes without affecting its operation.

The driving sheave 2 may also be designed for any practical number of belts, in accordance with the power to be transmitted, without affecting the design or operation of the compensating mechanism.

For lighter weight vehicles the compensating mechanism might be designed with only two spider gears, placed diametrically opposite, in which case the hub 3 could have either 2 spokes or 4 spokes attaching it to part 2, and the operating principle of the mechanism would remain unchanged.

I claim:

1. In an automobile, a driving axle assembly consisting of an axial shaft upon which is, loosely mounted, a grooved sheave containing differential gears radially disposed therein and having cover plates, containing lubricant seals at their central openings, attached to its sides, said sheave being detachable from its hub, tubes secured to and extending outwardly from each side of said sheave and rotatably disposed on said axial shaft and concentrically spaced about same by means of anti-friction bearings, said tubes having differential bevel gears fixed on their inner ends, engaging, in opposition, the radially disposed differential gears, and sleeved hubs non-rotatably secured to said tubes on their outer ends, journal boxes, containing anti-friction bearings, journaled on the sleeves of said sleeved hubs, a pair of radius rods, disposed one above the other, pivotally attached, in vertical alignment with the axial shaft center line, to each journal box and extending forwardly to similar pivotal attachment to the vehicle frame, vehicle springs seated against and secured to each journal box, and circular plates, having central openings for the free passage of said hub sleeves, vertically disposed at the outer side of each journal box and being rigidly attached thereto by means of angular brackets, said axial shaft serving as a base for the whole axle structure and to maintain the alignment thereof, said grooved sheave serving to receive multiple V belts and to be rotated thereby, said radially disposed differential gears serving to transmit forces between said grooved sheave and the bevel gears of the differential, and to provide for differential rotation of the tubes, said cover plates serving to enclose the differential mechanism and to retain the lubricant thereof, said sheave being detachable from its hub to permit the placement, or removal, of the radially disposed differential gears, said tubes serving to transmit forces between the differential bevel gears and the said sleeved hubs upon which vehicle wheels are mounted, said journal boxes providing for connections between the axle and the vehicle frame, said radius rods serving to transmit forces between the axle and the vehicle frame, said vehicle springs serving to support and spring the imposed load, and said vertically disposed circular plates, rigidly attached to the journal boxes, serving as fixed bases for the brake mechanism.

2. In a driving axle assembly, a differential mechanism consisting of a hub having an axial bore, loosely mounted on an axial shaft, said hub having arms, or spokes, extending radially therefrom, an annular rim having multiple grooves around its periphery, inwardly extending lugs, at its medial line, which are removably attached to the arms, or spokes, of said hub, inwardly extending block-like bases, at its medial line, each having a radially disposed well in its center, radially disposed differential gears rotatably retained in, and seated against, each said base, bevel gears of the differential, fixed on tubes rotatably disposed on said axial shaft and extending outwardly from each side of the differential, engaging the radially disposed differential gears in opposition, circular cover plates, having lubricant sealing material retained about central openings therein, vertically disposed and attached to the sides of said rim with said lubricant sealing material being held in rotatable contact with the backs of said bevel gears of the differential, said hub and its radial arms, or spokes, serving to maintain said grooved rim in perpendicular alignment with the said axial shaft and concentrically spaced about same, and, being detachable from said rim, providing for the placement, or removal, of said radially disposed gears of the differential, said grooved rim serving to transmit forces applied to it by multiple belts, to the bevel gears of the differential, by means of its radially disposed differential gears, and said cover plates serving to enclose the differential mechanism and to seal in the lubricant thereof.

3. In a driving axle assembly, an axial shaft having a differential mechanism disposed loosely thereon, having axial tubes rotatably disposed thereon in opposition, extending outwardly from each side of said differential and being concentrically spaced about said shaft by means of anti-friction bearings and being rotatably secured on said shaft by means of nuts threaded on each end of same, said axial tubes having bevel gears of the differential fixed on their inner ends and sleeved hubs nonrotatably secured on their outer ends, to which hubs vehicle wheels may be attached, and said axial tubes being journaled through floating journal boxes, said axial shaft providing a base for the parts assembled thereon and maintaining the axial alignment of said parts.

4. In a driving axle assembly, axial tubes, disposed in opposition, on an axial shaft, rotatably secured thereon and concentrically spaced about same by means of anti-friction bearings, said tubes extending outwardly from each side of a differential mechanism loosely disposed on said axial shaft, said tubes having differential bevel gears fixed on their inner ends and sleeved hubs non-rotatably secured on their outer ends, the sleeves of said hubs being journaled through floating journal boxes, said tubes serving to transmit forces between the differential and the sleeved hubs, and being maintained in alignment by the said axial shaft.

5. In a driving axle assembly, floating journal boxes disposed near each end of said axle assembly, driving tubes of said axle assembly, sleeves provided with hubs secured on said driving tubes, said journal boxes containing anti-friction bearings whereby the boxes are journaled on said sleeves, and means for retaining same, each said journal box having a pair of radius rods, disposed one above the other, pivotally attached and extending forwardly to similar pivotal attachment to the vehicle frame, a vehicle spring seated against and secured to each journal box, and, a circular plate having a central opening for the free passage of a hub sleeve aforesaid and vertically disposed between the outer side of said journal box and the outer end of said sleeved hub, said plate being rigidly attached to each journal box by means of angular brackets, said floating journal boxes providing for connections between the axle and the vehicle frame, said radius rods serving to transmit forces between the axle and the vehicle frame and to prevent rotation of the said journal boxes, said vehicle springs serving to support and spring the imposed load, and said vertically disposed circular plates providing fixed bases for the brake mechanism.

FRED B. McCLURE.